United States Patent
Zhang et al.

(10) Patent No.: US 11,187,448 B2
(45) Date of Patent: Nov. 30, 2021

(54) AIR CONDITIONER CONTROL METHOD INCLUDING DETERMINATION OF A CHILLER TARGET LOAD

(71) Applicant: Gree Electric Appliances, Inc. of Zhuhai, Guangdong (CN)

(72) Inventors: Zhiping Zhang, Guangdong (CN); Zhongkeng Long, Guangdong (CN); Chiliang Luo, Guangdong (CN); Bing Zhang, Guangdong (CN)

(73) Assignee: Gree Electric Appliances, Inc. of Zhuhai, Guangdong (CN)

( * ) Notice: Subject to any disclaimer, the term of this patent is extended or adjusted under 35 U.S.C. 154(b) by 0 days.

(21) Appl. No.: 16/962,557

(22) PCT Filed: Dec. 12, 2018

(86) PCT No.: PCT/CN2018/120559
§ 371 (c)(1),
(2) Date: Jul. 16, 2020

(87) PCT Pub. No.: WO2019/179177
PCT Pub. Date: Sep. 26, 2019

(65) Prior Publication Data
US 2020/0408449 A1 Dec. 31, 2020

(30) Foreign Application Priority Data
Mar. 20, 2018 (CN) .......................... 201810230354.3

(51) Int. Cl.
*F25B 49/02* (2006.01)
*F25B 39/00* (2006.01)

(52) U.S. Cl.
CPC ............ *F25B 49/022* (2013.01); *F25B 39/00* (2013.01); *F25B 49/027* (2013.01);
(Continued)

(58) Field of Classification Search
CPC .................. F25B 49/022; F25B 49/027; F25B 2600/027; F25B 2700/151;
(Continued)

(56) References Cited

U.S. PATENT DOCUMENTS

2014/0180483 A1* 6/2014 Cheng ................ G05D 23/1931 700/278
2015/0354849 A1 12/2015 Matsuo et al.

FOREIGN PATENT DOCUMENTS

CN 202547019 U 11/2012
CN 104315673 A 1/2015
(Continued)

*Primary Examiner* — Jonathan Bradford
(74) *Attorney, Agent, or Firm* — The Webb Law Firm (57) ABSTRACT

The invention provides an air conditioner control method and device and an air conditioner. The air conditioner control device acquires a current temperature of a chilled water of a unit at a preset period; determine a target load of the unit, a target temperature of a chilled water and a target temperature of a cooling water based on a temperature of the chilled water set by a user and the current temperature of the chilled water; determine an evaporating parameter and a condensing parameter of the unit based on the target load of the unit, the target temperature of the chilled water and the target temperature of the cooling water; and determine operation parameters of a compressor based on the target load of the unit, the evaporation parameter and the condensation parameter. Therefore, the unit can operate based on the operation parameters.

9 Claims, 3 Drawing Sheets (52) U.S. Cl.
CPC ... *F25B 2600/027* (2013.01); *F25B 2700/151* (2013.01); *F25B 2700/193* (2013.01); *F25B 2700/195* (2013.01); *F25B 2700/197* (2013.01); *F25B 2700/21* (2013.01); *F25B 2700/21161* (2013.01); *F25B 2700/21171* (2013.01)

(58) Field of Classification Search
CPC .......... F25B 2700/193; F25B 2700/195; F25B 2700/197; F25B 2700/21
See application file for complete search history.

(56) References Cited

FOREIGN PATENT DOCUMENTS

| | | | |
|---|---|---|---|
| CN | 106765855 | A | 5/2017 |
| CN | 107421062 | A | 12/2017 |
| CN | 108444159 | A | 8/2018 |
| JP | 2007298235 | A | 11/2007 |
| JP | 2010210222 | A | 9/2010 |
| JP | 2012117698 | A | 6/2012 |

\* cited by examiner

AIR CONDITIONER CONTROL METHOD INCLUDING DETERMINATION OF A CHILLER TARGET LOAD

CROSS-REFERENCE TO RELATED APPLICATIONS

This application is the United States national phase of International Application No. PCT/CN2018/120559 filed Dec. 12, 2018, and claims priority to Chinese Patent Application No. 201810230354.3 filed Mar. 20, 2018, the disclosures of which are hereby incorporated by reference in their entirety

BACKGROUND OF THE INVENTION

Field of the Invention

The disclosure relates to the field of air conditioners, in particular to an air conditioner control method and device and an air conditioner.

Description of Related Art

With the rapid development of national economy, the demand of China for energy is increasing day by day, and the problem of energy shortage is more and more prominent. In many buildings, the energy consumption of the central air conditioning system accounts for a large portion of the total energy consumption of the building.

SUMMARY OF THE INVENTION

According to a first aspect of an embodiment of the present disclosure, there is provided an air conditioner control method comprising: acquiring a current temperature of a chilled water of a unit at a preset period; determining a target load of the unit, a target temperature of the chilled water and a target temperature of a cooling water according to a temperature of the chilled water set by a user and the current temperature of the chilled water; determining an evaporation parameter and a condensation parameter of the unit according to the target load of the unit, the target temperature of the chilled water and the target temperature of the cooling water; and determining operation parameters of a compressor according to the target load of the unit, the evaporation parameter and the condensation parameter for the unit to operate according to the operation parameters.

In some embodiments, the determining the target load of the unit, the target temperature of the chilled water and the target temperature of the cooling water comprises: calculating a difference value between the current temperature of the chilled water and the temperature of the chilled water set by the user; determining the target load of the unit corresponding to the difference value; and determining the target temperature of the chilled water and the target temperature of the cooling water corresponding to the target load of the unit.

In some embodiments, the air conditioner control method further comprising: calculating a temperature difference between the current temperature of the chilled water and a temperature of the chilled water of the unit acquired in the previous period after determining the target load of the unit; determining whether the temperature difference is larger than the difference value; reducing the target load of the unit by a preset magnitude under the condition that the temperature difference is greater than the difference value; and determining the target temperature of the chilled water and the target temperature of the cooling water corresponding to the reduced target load of the unit.

In some embodiments, the air conditioner control method further comprising: increasing the target load of the unit by a preset magnitude under the condition that the temperature difference is less than the difference value; and determining the target temperature of the chilled water and the target temperature of the cooling water corresponding to the increased target load of the unit.

In some embodiments, the target load of the unit comprises an evaporator load and a condenser load; the evaporation parameter of the unit comprises an target evaporation pressure, and the condensation parameter of the unit comprises a target condensation pressure.

In some embodiments, the determining the evaporation parameter and the condensation parameter of the unit comprises: determining the target evaporation pressure according to the evaporator load and the target temperature of the chilled water; and determining the target condensing pressure according to the condenser load and the target temperature of the cooling water.

In some embodiments, the determining the operation parameters of the compressor comprises: obtaining an operation frequency of the compressor according to the target load of the unit, the target evaporation pressure and the target condensation pressure for the compressor to operate at the operation frequency; obtaining an external pressure ratio of the compressor according to the target evaporation pressure and the target condensation pressure; and adjusting a current internal pressure ratio of the compressor in conformity with the external pressure ratio of the compressor.

In some embodiments, the air conditioner control method further comprising: detecting a current power of the compressor as a first power after adjusting the current internal pressure ratio of the compressor; reducing the current internal pressure ratio of the compressor according to a preset magnitude, and detecting the current power of the compressor as a second power; increasing the current internal pressure ratio of the compressor according to a preset magnitude, and detecting the current power of the compressor as a third power; and taking the minimum value of the first power, the second power and the third power as the operation power of the compressor.

According to a second aspect of an embodiment of the present disclosure, there is provided an air conditioner control device comprising: an acquisition module, configured to acquire a current temperature of a chilled water of a unit at a preset period; a first parameter determination module, configured to determine a target load of the unit, a target temperature of the chilled water and a target temperature of a cooling water according to a temperature of the chilled water set by a user and the current temperature of the chilled water; a second parameter determination module, configured to determine an evaporation parameter and a condensation parameter of the unit according to the target load of the unit, the target temperature of the chilled water and the target temperature of the cooling water; and a parameter optimization module, configured to determine operation parameters of a compressor according to the target load of the unit, the evaporation parameter and the condensation parameter for the unit to operate according to the operation parameters.

In some embodiments, the first parameter determination module is configured to calculate a difference value between the current temperature of the chilled water and the temperature of the chilled water set by the user, determine the target load of the unit corresponding to the difference value, and determine the target temperature of the chilled water and the target temperature of the cooling water corresponding to the target load of the unit.

In some embodiments, the first parameter determination module is further configured to calculate a temperature difference between the current temperature of the chilled water and a temperature of the chilled water of the unit acquired in the previous period after determining the target load of the unit, determine whether the temperature difference is larger than the difference value, reduce the target load of the unit by a preset magnitude under the condition that the temperature difference is greater than the difference value, and determine the target temperature of the chilled water and the target temperature of the cooling water corresponding to the reduced target load of the unit.

In some embodiments, the first parameter determination module is further configured to increase the target load of the unit by a preset magnitude under the condition that the temperature difference is less than the difference value, and determine the target temperature of the chilled water and the target temperature of the cooling water corresponding to the increased target load of the unit.

In some embodiments, the target load of the unit comprises an evaporator load and a condenser load; the evaporation parameter of the unit comprises an target evaporation pressure, and the condensation parameter of the unit comprises a target condensation pressure.

In some embodiments, the second parameter determination module is configured to determine the target evaporation pressure according to the evaporator load and the target temperature of the chilled water, and determine the target condensing pressure according to the condenser load and the target temperature of the cooling water.

In some embodiments, the parameter optimization module is configured to obtain an operation frequency of the compressor according to the target load of the unit, the target evaporation pressure and the target condensation pressure for the compressor to operate at the operation frequency, obtain an external pressure ratio of the compressor according to the target evaporation pressure and the target condensation pressure, and adjust a current internal pressure ratio of the compressor in conformity with the external pressure ratio of the compressor.

In some embodiments, the parameter optimization module is further configured to detect a current power of the compressor as a first power after adjusting the current internal pressure ratio of the compressor, reduce the current internal pressure ratio of the compressor according to a preset magnitude, and detecting the current power of the compressor as a second power, increase the current internal pressure ratio of the compressor according to a preset magnitude, and detecting the current power of the compressor as a third power, and take the minimum value of the first power, the second power and the third power as the operation power of the compressor.

According to a third aspect of an embodiment of the present disclosure, there is provided an air conditioner control device comprising: a memory configured to store instructions; a processor coupled to the memory and configured to: acquire a current temperature of a chilled water of a unit at a preset period; determine a target load of the unit, a target temperature of the chilled water and a target temperature of a cooling water according to a temperature of the chilled water set by a user and the current temperature of the chilled water; determine an evaporation parameter and a condensation parameter of the unit according to the target load of the unit, the target temperature of the chilled water and the target temperature of the cooling water; and determine operation parameters of a compressor according to the target load of the unit, the evaporation parameter and the condensation parameter for the unit to operate according to the operation parameters.

According to a fourth aspect of an embodiment of the present disclosure, there is provided an air conditioner comprising: an air conditioner control device according to any of the above embodiments.

According to a fifth aspect of an embodiment of the present disclosure, there is provided a non-transitory computer-readable storage medium, wherein the computer-readable storage medium stores computer instructions which, when executed by a processor, implement the method according to any one of the embodiments.

Other features of the present disclosure and advantages thereof will become apparent from the following detailed description of exemplary embodiments thereof, which proceeds with reference to the accompanying drawings.

BRIEF DESCRIPTION OF THE FIGURES

In order to more clearly illustrate the embodiments of the present disclosure or the technical solutions in the prior art, the drawings used in the embodiments or the description of the prior art will be briefly described below. Apparently, the drawings in the following description are only some embodiments of the present disclosure, and for those skilled in the art, other drawings may be obtained according to the drawings without paying inventive labor.

DESCRIPTION IF THE INVENTION

The technical solutions in the embodiments of the present disclosure will be described clearly and completely with reference to the drawings in the embodiments of the present disclosure, and it is obvious that the embodiments described are only some, instead of all, of the embodiments of the present disclosure. The following description of at least one exemplary embodiment is merely illustrative in nature and is in no way intended to limit the disclosure, its application, or uses. All other embodiments, which can be derived by a person skilled in the art from the embodiments disclosed herein without inventive step, are intended to be within the scope of the present disclosure.

Unless specifically stated otherwise, the relative arrangement of parts and steps, numerical expressions and numerical values set forth in these embodiments do not limit the scope of the present disclosure.

Meanwhile, it should be understood that, for the convenience of description, the sizes of the respective portions shown in the drawings are not drawn in an actual proportional relationship.

Techniques, methods, and devices known to one of ordinary skill in the relevant art may not be discussed in detail but are intended to be part of the authorized specification where appropriate.

In all examples shown and discussed herein, any particular value should be construed as exemplary only and not as limiting. Thus, other examples of the exemplary embodiments may have different values.

It should be noted that: similar reference numbers and letters refer to similar items in the following figures, and thus, once an item is defined in one figure, it need not be discussed further in subsequent figures.

The inventors have found through research that a load of an air conditioning system varies with season, climate and the number of people in the room. A refrigeration capacity of a chiller unit of the air conditioner needs to be matched with the load, such that the refrigeration capacity needs to be changed correspondingly. Under the condition of continuously changed water temperature and load, the unit cannot operate at the optimal point.

Therefore, the present disclosure provides a scheme capable of ensuring that the chiller unit of the air conditioner can operate in the optimal state.

Figure 1:
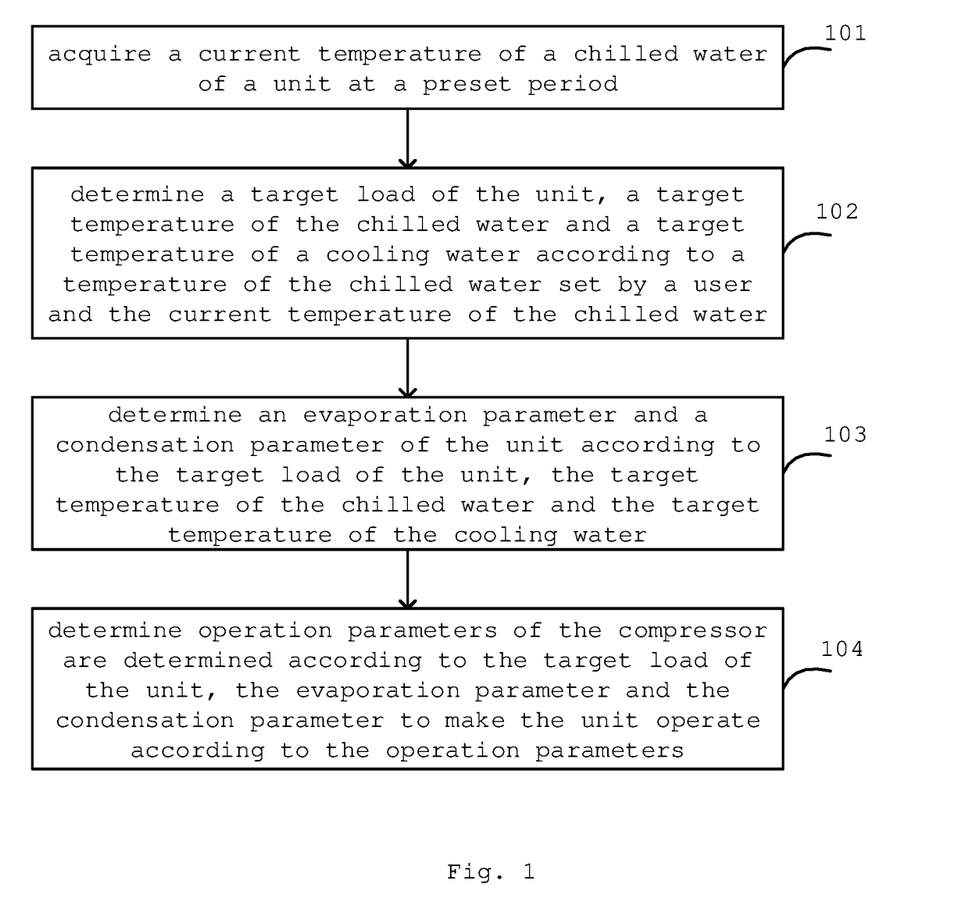
FIG. 1 is an exemplary flowchart of an air conditioner control method according to one embodiment of the present disclosure.

FIG. 1 is an exemplary flowchart of an air conditioner control method according to one embodiment of the present disclosure. In some embodiments, the steps of the present embodiment may be performed by an air conditioner control device.

In step 101, a current temperature of a chilled water of the unit is acquired at a preset period.

In step 102, a target load of the unit, a target temperature of the chilled water and a target temperature of a cooling water are determined according to a temperature of the chilled water set by a user and the current temperature of the chilled water.

In some embodiments, in step 102, a difference value ΔT between the current temperature of the chilled water and the temperature of the chilled water set by the user is calculated, and the target load of the unit is determined corresponding to the difference value ΔT, and the target temperature of the chilled water and target temperature of the cooling water are determined corresponding to the target load of the unit.

For example, the correspondence relationship between the difference value between the current temperature of the chilled water and the temperature of the chilled water set by the user and the target load of the unit, and the correspondence relationship between the target load of the unit and the target temperature of the chilled water and the target temperature of the cooling water may be obtained through experiments in advance. Therefore, the target load of the unit, the target temperature of the chilled water and the target temperature of the cooling water are determined by using a look-up table.

It should be noted that the above embodiment is only used as an example, which does not mean that the disclosure is limited thereto. The person skilled in the art can also perform parameter determination in other realizable manners.

In some embodiments, the target load of the unit includes an evaporator load and a condenser load.

In step 103, an evaporation parameter and a condensation parameter of the unit are determined according to the target load of the unit, the target temperature of the chilled water and the target temperature of the cooling water.

In some embodiments, the evaporation parameter of the unit comprises an target evaporation pressure and the condensation parameter of the unit comprises a target condensation pressure.

In step 104, operation parameters of the compressor are determined according to the target load of the unit, the evaporation parameter and the condensation parameter, so that the unit can operates according to the operation parameters.

In the embodiment of the air conditioner control method, the air conditioning unit can be efficiently operated by performing optimization control, to ensure high-reliability operation of the whole cold water system.

In some embodiments, in step 102, a temperature difference between the current temperature of the chilled water and a temperature of the chilled water of the unit acquired in the previous period is further calculated after the target load of the unit is determined, and it is determined whether the temperature difference is greater than the difference value ΔT. If the temperature difference is larger than the difference value ΔT, the target load of the unit is reduced by a preset magnitude, and the target temperature of the chilled water and target temperature of the cooling water are determined corresponding to the reduced target load of the unit.

If the temperature difference is less than the difference value ΔT, the target load of the unit is increased by a preset magnitude, and the target temperature of the chilled water and the target temperature of the cooling water are determined corresponding to the increased target load of the unit.

For example, in a certain operation period, the current temperature of the chilled water of the unit is acquired to be Ta, while the temperature of the chilled water of the unit acquired in the previous operation period is Tb, so that the temperature difference is Tb−Ta. If Tb−Ta is greater than the difference value ΔT between the current temperature of the chilled water and the temperature of the chilled water set by the user, the target load of the unit is adjusted from Q1 to Q2, wherein Q2<Q1. And if Tb−Ta is less than the difference value ΔT between the current temperature of the chilled water and the temperature of the chilled water set by the user, the target load of the unit is adjusted from Q1 to Q3, wherein Q3>Q1. Therefore, the overlarge change rate of the temperature of the chilled water can be effectively avoided.

In some embodiments, in step 103, the target evaporation pressure may be determined based on the evaporator load and the target temperature of the chilled water. And the target condensation pressure is determined according to the condenser load and the target temperature of the cooling water.

For example, the correlation between the evaporator load, the target temperature of the chilled water, and the target evaporation pressure may be obtained in advance through experiments, and the correlation between the condenser load, the target temperature of the cooling water, and the target condensation pressure may be obtained through experiments, so that the target evaporation pressure and target condensation pressure can be obtained by using a look-up table.

It should be noted that the above embodiment is only used as an example, which does not mean that the present disclosure is limited thereto. The person skilled in the art can also perform parameter determination in other realizable manners.

In some embodiments, in step 104, the operation parameters of the compressor are determined according to the target load of the unit, the evaporation parameter and the condensation parameter includes:

the operation frequency of the compressor is obtained according to the target load of the unit, the target evaporation pressure and the target condensation pressure, so that the compressor can operate at the operation frequency. The external pressure ratio of the compressor is obtained according to the target evaporation pressure and the target condensation pressure, and the current internal pressure ratio of the compressor is adjusted in conformity with the external pressure ratio of the compressor.

For example, the correlation between the operation frequency of the compressor and the evaporator load, the condenser load, the evaporation parameter and the condensation parameter may be obtained through experiments in advance. Therefore, the operation frequency of the compressor can be obtained corresponding to the evaporator load, the condenser load, the evaporation parameter and the condensation parameter by using a look-up table.

In addition, the more approximate the internal pressure ratio of the compressor is to the external pressure ratio, the higher the operation efficiency of the unit. Therefore, the current internal pressure ratio of the compressor can be adjusted in conformity with the external pressure ratio of the compressor by firstly utilizing the target evaporation pressure and the target condensation pressure to obtain the external pressure ratio of the compressor and then adjusting the current internal pressure ratio of the compressor. In this way, coarse adjustment of the internal pressure ratio can be realized.

It should be noted that, since the pressure ratio varies with a rotation speed as the rotation speed increases, it is necessary to further fine-tune the internal pressure ratio for the compressor to operate at the optimum parameters.

For example, a power of the compressor at the moment is W1, i.e., a first power, and the internal pressure ratio is V1. The internal pressure ratio is increased by one step to obtain the adjacent internal pressure ratio V2, and the power of the compressor at the moment is W2, i.e., a second power. And then the internal pressure ratio is reduced from V1 by one step to obtain the adjacent internal pressure ratio V3, and the power of the compressor at the moment is W3, i.e., a third power. By comparing the first power W1, the second power W2 and the third power W3, the minimum power value is taken as the operation power of the compressor. Thus, fine adjustment of the internal pressure ratio can be realized.

Figure 2:
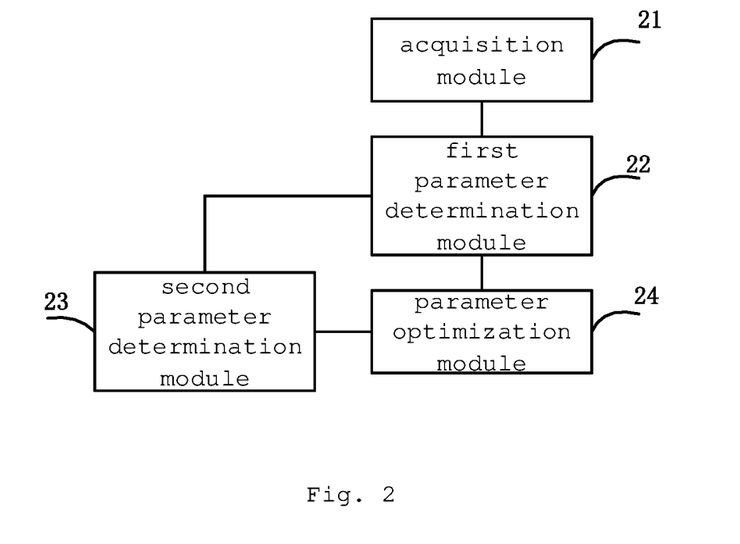
FIG. 2 is an exemplary block diagram of an air conditioner control device according to one embodiment of the present disclosure.

FIG. 2 is an exemplary block diagram of an air conditioner control device according to one embodiment of the present disclosure. As shown in FIG. 2, the air conditioner control device includes an acquisition module 21, a first parameter determination module 22, a second parameter determination module 23, and a parameter optimization module 24.

The acquisition module 21 is configured to acquire a current temperature of a chilled water of a unit at a preset period.

The first parameter determination module 22 is configured to determine a target load of the unit, a target temperature of the chilled water and a target temperature of a cooling water according to a temperature of the chilled water set by a user and the current temperature of the chilled water.

In some embodiments, the first parameter determination module 22 is configured to calculate a difference value ΔT between the current temperature of the chilled water and the temperature of the chilled water set by a user, determine the target load of the unit according to the difference value ΔT, and determine the target temperature of the chilled water and the target temperature of the cooling water corresponding to the target load of the unit.

In some embodiments, the first parameter determination module 22 is further configured to calculate a temperature difference between the current temperature of the chilled water and a temperature of the chilled water of the unit acquired in the previous period after determining the target load of the unit, and determine whether the temperature difference is greater than the difference value ΔT. If the temperature difference is greater than the difference value ΔT, the first parameter determination module 22 reduces the target load of the unit by a preset magnitude, and determines the target temperature of the chilled water and the target temperature of the cooling water corresponding to the reduced target load of the unit.

In some embodiments, the first parameter determination module 22 is further configured to increase the target load of the unit by a preset magnitude if the temperature difference is smaller than the difference value ΔT, and determine the target temperature of the chilled water and target temperature of the cooling water corresponding to the increased target load of the unit.

In some embodiments, the target load of the unit includes an evaporator load and a condenser load.

The second parameter determination module 23 is configured to determine an evaporation parameter and a condensation parameter of the unit according to the target load of the unit, the target temperature of the chilled water, and the target temperature of the cooling water.

In some embodiments, the evaporation parameter of the unit comprises an target evaporation pressure and the condensation parameter of the unit comprises a target condensation pressure.

In some embodiments, the second parameter determination module 23 is configured to determine the target evaporation pressure based on the evaporator load and the target temperature of the chilled water, and determine the target condensation pressure based on the condenser load and the target temperature of the chilled water.

The parameter optimization module 24 is configured to determine the operation parameters of the compressor based on the target load of the unit, the evaporation parameter and the condensation parameter, so that the unit operates according to the operation parameters.

In some embodiments, the parameter optimization module 24 is configured to obtain an operation frequency of the compressor according to the target load of the unit, the target evaporation pressure and the target condensation pressure for the compressor to operate at the operation frequency, obtain an external pressure ratio of the compressor according to the target evaporation pressure and the target condensation pressure, and adjust the current internal pressure ratio of the compressor in conformity with the external pressure ratio of the compressor. In this way, coarse adjustment of the internal pressure ratio is realized.

In some embodiments, the parameter optimization module 24 is further configured to detect a current power W1 of the compressor, i.e., a first power, after adjusting the current internal pressure ratio of the compressor. The parameter optimization module 24 decreases the current internal pressure ratio V of the compressor by a preset magnitude and detects the current power W2 of the compressor, i.e., a second power. The parameter optimization module 24 increases the current internal pressure ratio V of the compressor by a preset magnitude and detects the current power W3 of the compressor, i.e., a third power. The parameter optimization module 24 takes the minimum value among the first power W1, the second power W2 and the third power W3 as the operation power of the compressor, thereby achieving fine adjustment of the internal pressure ratio.

Figure 3:
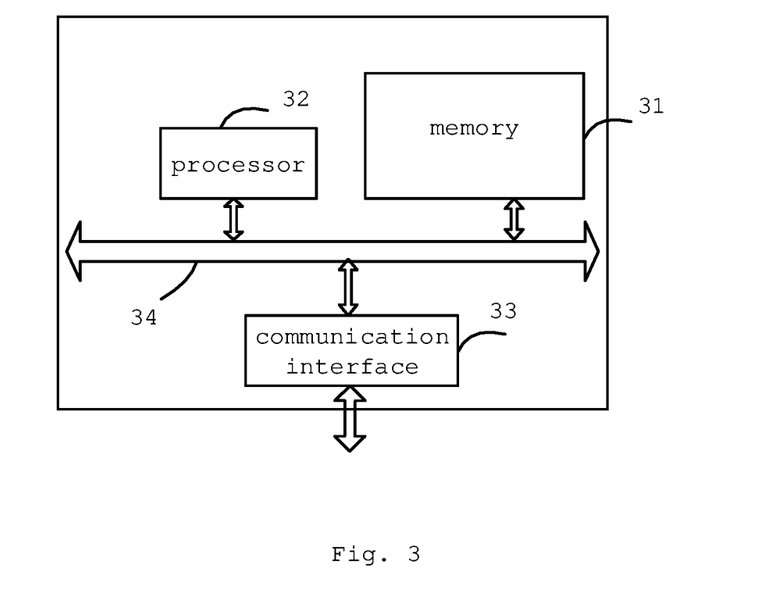
FIG. 3 is an exemplary block diagram of an air conditioner control device according to another embodiment of the present disclosure.

FIG. 3 is an exemplary block diagram of an air conditioner control device according to another embodiment of the present disclosure. As shown in FIG. 3, the air conditioner control device includes a memory 31 and a processor 32.

The memory 31 is used for storing instructions, and the processor 32 is coupled to the memory 31, and the processor 32 is configured to execute the method according to any embodiment in FIG. 1 based on the instructions stored in the memory.

As shown in FIG. 3, the air conditioner control device further includes a communication interface 33 for information interaction with other devices. Meanwhile, the air conditioner control device also comprises a bus 34, and the processor 32, the communication interface 33 and the memory 31 are communicated with each other through the bus 34.

The memory 31 may comprise high-speed RAM memory, and may also include non-volatile memory, such as at least one disk memory. The memory 31 may also be a memory array. The storage 31 may also be partitioned into blocks and the blocks may be combined into virtual volumes according to certain rules.

In addition, the processor 32 may be a central processing unit CPU, or may be an application specific integrated circuit ASIC, or one or more integrated circuits configured to implement embodiments of the present disclosure.

The present disclosure also relates to a computer-readable storage medium, in which computer instructions are stored, and when executed by a processor, the instructions implement the method according to any one of the embodiments in FIG. 1.

Figure 4:
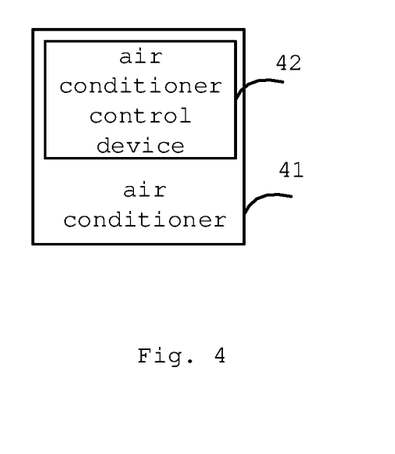
FIG. 4 is an exemplary block diagram of an air conditioner according to one embodiment of the present disclosure.

FIG. 4 is an exemplary block diagram of an air conditioner according to one embodiment of the present disclosure. As shown in FIG. 4, an air conditioner control device 42 is provided in the air conditioner 41. In some embodiments, the air conditioner control device 42 may be any of the air conditioner control devices described in either of FIG. 2 or FIG. 3.

In some embodiments, the functional unit modules described above can be implemented as a general purpose Processor, a Programmable Logic Controller (PLC), a Digital Signal Processor (DSP), an Application Specific Integrated Circuit (ASIC), a Field-Programmable Gate Array (FPGA) or other Programmable Logic device, discrete Gate or transistor Logic, discrete hardware components, or any suitable combination thereof for performing the functions described in this disclosure.

By implementing the present disclosure, all components of the air conditioning unit can operate in the optimal operation state, so that the high-reliability operation of the air conditioning unit is ensured.

It will be understood by those skilled in the art that all or part of the steps for implementing the above embodiments may be implemented by hardware, or may be implemented by a program instructing relevant hardware, where the program may be stored in a computer-readable storage medium which may be a read-only memory, a magnetic disk or an optical disk.

The description of the present disclosure has been presented for purposes of illustration and description, and is not intended to be exhaustive or limited to the disclosure in the form disclosed. Many modifications and variations will be apparent to those of ordinary skill in this art. The embodiments were chosen and described in order to best explain the principles of the disclosure and the practical application, and to enable those of ordinary skill in the art to understand the disclosure thereby to design various embodiments with different modifications suitable for particular uses.

What is claimed is:

1. An air conditioner control method, comprising:
   acquiring a current temperature of a chilled water of a unit at a preset period;
   calculating a difference value between the current temperature of a chilled water and the temperature of the chilled water set by a user;
   determining a target load of the unit corresponding to the difference value;
   determining a target temperature of a chilled water and the target temperature of a cooling water corresponding to the target load of the unit;
   determining an evaporation parameter and a condensation parameter of the unit according to the target load of the unit, the target temperature of the chilled water and the target temperature of the cooling water;
   determining operation parameters of a compressor according to the target load of the unit, the evaporation parameter and the condensation parameter for the unit to operate according to the operation parameters;
   calculating a temperature difference between the current temperature of the chilled water and a temperature of the chilled water of the unit acquired in a previous period After determining the target load of the unit;
   determining whether the temperature difference is larger than the difference value;
   reducing the target load of the unit by a preset magnitude under a condition that the temperature difference is greater than the difference value; and
   determining the target temperature of the chilled water and the target temperature of the cooling water corresponding to the reduced target load of the unit.

2. The air conditioner control method according to claim 1, further comprising:
   increasing the target load of the unit by a preset magnitude under a condition that the temperature difference is less than the difference value; and
   determining the target temperature of the chilled water and the target temperature of the cooling water corresponding to the increased target load of the unit.

3. The air conditioner control method according to claim 1, wherein:
   the target load of the unit comprises an evaporator load and a condenser load; and
   the evaporation parameter of the unit comprises a target evaporation pressure, and the condensation parameter of the unit comprises a target condensation pressure.

4. The air conditioner control method according to claim 3, wherein the determining the evaporation parameter and the condensation parameter of the unit comprises:
   determining the target evaporation pressure according to the evaporator load and the target temperature of the chilled water; and
   determining the target condensation pressure according to the condenser load and the target temperature of the cooling water.

5. The air conditioner control method according to claim 3, wherein the determining the operation parameters of the compressor comprises:
   obtaining an operation frequency of the compressor according to the target load of the unit, the target evaporation pressure and the target condensation pressure for the compressor to operate at the operation frequency;
   obtaining an external pressure ratio of the compressor according to the target evaporation pressure and the target condensation pressure; and adjusting a current internal pressure ratio of the compressor in conformity with the external pressure ratio of the compressor.

6. The air conditioner control method as claimed in claim 5, further comprising:
    detecting a current power of the compressor as a first power after adjusting the current internal pressure ratio of the compressor;
    reducing the current internal pressure ratio of the compressor according to a preset magnitude, and detecting the current power of the compressor as a second power;
    increasing the current internal pressure ratio of the compressor according to a preset magnitude, and detecting the current power of the compressor as a third power; and
    taking the minimum value of the first power, the second power and the third power as the operation power of the compressor.

7. A non-transitory computer readable storage medium, wherein the computer readable storage medium stores computer instructions which, when executed by a processor, implement the method of claim 1.

8. An air conditioner control device, comprising:
    a memory configured to store instructions;
    a processor coupled to the memory and configured to:
        acquire a current temperature of a chilled water of a unit at a preset period;
        calculate a difference value between the current temperature of the chilled water and a temperature of the chilled water set by a user;
        determine a target load of the unit corresponding to the difference value;
        determine a target temperature of the chilled water and a target temperature of a cooling water corresponding to the target load of the unit;
        determine an evaporation parameter and a condensation parameter of the unit according to the target load of the unit, the target temperature of the chilled water and the target temperature of the cooling water;
        determine operation parameters of a compressor according to the target load of the unit, the evaporation parameter and the condensation parameter for the unit to operate according to the operation parameters;
        calculate a temperature difference between the current temperature of the chilled water and a temperature of the chilled water of the unit acquired in the previous period after determining the target load of the unit;
        determine whether the temperature difference is larger than the difference value;
        reduce the target load of the unit by a preset magnitude under a condition that the temperature difference is greater than the difference value; and
        determine the target temperature of the chilled water and the target temperature of the cooling water corresponding to the reduced target load of the unit.

9. An air conditioner, comprising: the air conditioner control device according to claim 8.

* * * * *

UNITED STATES PATENT AND TRADEMARK OFFICE
CERTIFICATE OF CORRECTION

PATENT NO. : 11,187,448 B2
APPLICATION NO. : 16/962557
DATED : November 30, 2021
INVENTOR(S) : Zhang et al.

Page 1 of 1

It is certified that error appears in the above-identified patent and that said Letters Patent is hereby corrected as shown below:

In the Claims

Column 10, Line 6, Delete "a" and insert -- the --

Column 10, Line 6, Delete "the" and insert -- a --

Column 10, Line 10, Delete "the" and insert -- a --

Column 10, Line 24, Delete "After" and insert -- after --

Column 12, Line 18, Delete "the" and insert -- a --

Signed and Sealed this
First Day of March, 2022

Drew Hirshfeld
*Performing the Functions and Duties of the
Under Secretary of Commerce for Intellectual Property and
Director of the United States Patent and Trademark Office*